US00RE45835E

(19) United States
(12) Reissued Patent
Kohinata

(10) Patent Number: US RE45,835 E
(45) Date of Reissued Patent: Jan. 12, 2016

(54) MOTOR SCOOTER

(71) Applicant: SUZUKI MOTOR CORPORATION, Shizuoka-Ken (JP)

(72) Inventor: Yoshinori Kohinata, Shizuoka-Ken (JP)

(73) Assignee: Suzuki Motor Corporation, Shizuoka-ken (JP)

(21) Appl. No.: 29/472,138

(22) Filed: Nov. 8, 2013

Related U.S. Patent Documents

Reissue of:
(64) Patent No.: Des. 688,163
Issued: Aug. 20, 2013
Appl. No.: 29/439,561
Filed: Dec. 12, 2012

(30) Foreign Application Priority Data

Jun. 18, 2012 (JP) ..... 2012-014402

(51) LOC (10) Cl. ..... 12-11
(52) U.S. Cl.
USPC ..... D12/110
(58) Field of Classification Search
USPC ..... D12/109, 110, 111, 114, 117, 126, 184, D12/186; D21/432, 458, 538; 180/210–217, 180/219, 220, 225, 229, 908; 280/103, 124, 280/152.1–152.3, 288.2, 288.4, 304.3, 770, 280/827, 828, 847, 848; 296/77.1, 78.1, 296/181.1, 187.01, 187.12, 192, 193.01, 296/193.04, 193.05, 193.09; 446/440
CPC ..... B62K 9/00; B62K 11/04; B62M 7/12; A63H 17/21
See application file for complete search history.

(56) References Cited

U.S. PATENT DOCUMENTS 4,800,980 A * 1/1989 Hideo et al. ..... 180/225
6,623,071 B2 * 9/2003 Kawamoto et al. ..... 297/195.13

(Continued)

FOREIGN PATENT DOCUMENTS

EP 1304283 A1 * 4/2003 ..... B62J 9/00
JP 11268678 A * 10/1999 ..... B62J 25/00

(Continued)

OTHER PUBLICATIONS 2006-2008 Suzuki Burgman cycles pictured on pp. 1-4 of 5. [Retrieved on Apr. 16, 2013]. Retrieved from the Internet <URL: http://www.suzuki-bikes.com/tag/burgman/>.*

*Primary Examiner* — Philip S Hyder
*Assistant Examiner* — Darlington Ly
(74) *Attorney, Agent, or Firm* — Alston & Bird LLP

(57) CLAIM

I claim the ornamental design for a motor scooter, as shown and described.

DESCRIPTION

Figure 1:
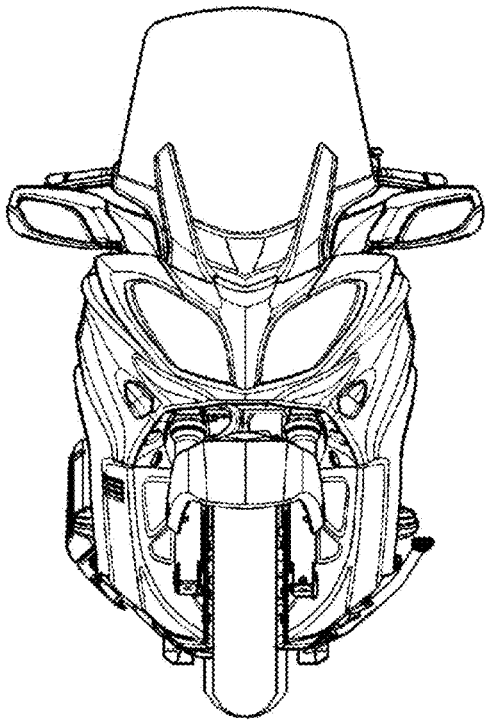
Figure 2:
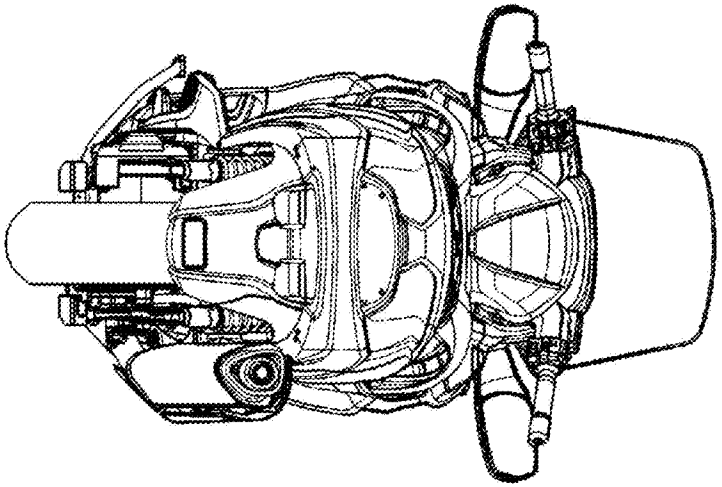
Figure 3:
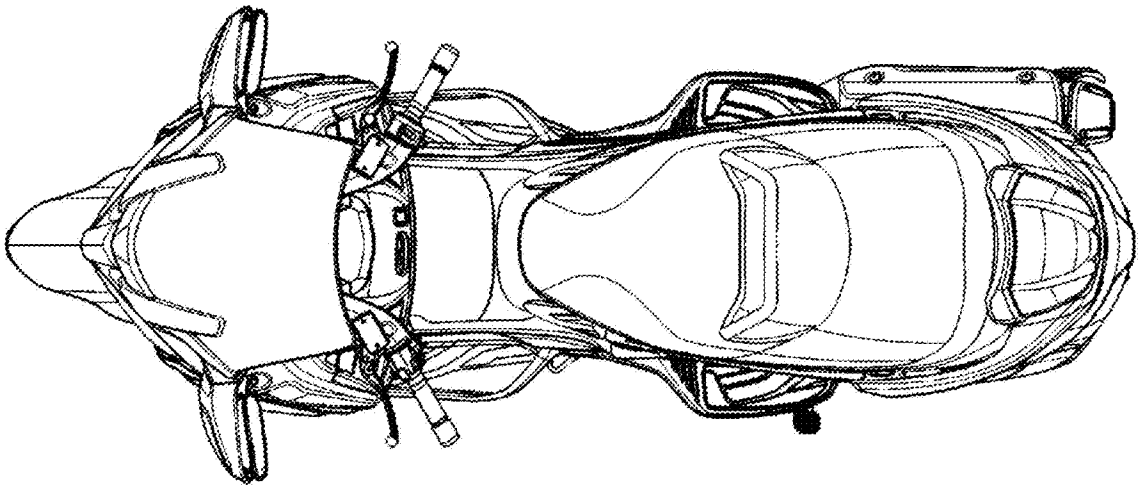

FIG. 1 is a front view of a motor scooter showing our new design;
FIG. 2 is a rear view thereof;
FIG. 3 is a top view thereof;
[FIG. 4 is a bottom view thereof;]
FIG. [5] *4* is a right side view thereof;
FIG. [6] *5* is a left side view thereof;
FIG. [7] *6* is a [diagonally forward right side] *front and right side* perspective view thereof;
FIG. [8] *7* is a [diagonally backward right side] *rear and right side* perspective view thereof;
FIG. [9] *8* is a [diagonally forward left side] *front and left side* perspective view thereof; and,
FIG. [10] *9* is a [diagonally backward left side] *rear and left side* perspective view thereof.

1 Claim, 9 Drawing Sheets

Matter enclosed in heavy brackets [ ] appears in the original patent but forms no part of this reissue; matter printed in italics indicates the additions made by reissue.

[AMENDED]

(56) References Cited

U.S. PATENT DOCUMENTS

| | | | | | |
|---|---|---|---|---|---|
| D521,415 | S | * | 5/2006 | Kojima et al. | D12/110 |
| D534,838 | S | * | 1/2007 | Kato et al. | D12/110 |
| D556,093 | S | * | 11/2007 | Tanaka et al. | D12/110 |
| D564,415 | S | * | 3/2008 | Maeda | D12/110 |
| D564,417 | S | * | 3/2008 | Uchiyama | D12/110 |
| D605,562 | S | * | 12/2009 | Kitayama et al. | D12/110 |
| D606,906 | S | * | 12/2009 | Chosa | D12/110 |
| D627,689 | S | * | 11/2010 | Ishiguri et al. | D12/110 |
| D656,435 | S | * | 3/2012 | Lambri et al. | D12/110 |
| D669,397 | S | * | 10/2012 | Isokari | D12/110 |
| D670,206 | S | * | 11/2012 | Nitta et al. | D12/110 |
| D670,207 | S | * | 11/2012 | Otombe | D12/110 |
| D671,038 | S | * | 11/2012 | Huang et al. | D12/110 |
| D674,321 | S | * | 1/2013 | Huang et al. | D12/110 |
| D682,743 | S | * | 5/2013 | Lambri et al. | D12/110 |
| D688,163 | S | * | 8/2013 | Kohinata | D12/110 |
| D688,598 | S | * | 8/2013 | Lambri et al. | D12/110 |
| D690,624 | S | * | 10/2013 | Okubo et al. | D12/110 |

FOREIGN PATENT DOCUMENTS

| | | | | | |
|---|---|---|---|---|---|
| JP | 2001260968 | A | * | 9/2001 | B62J 9/00 |
| JP | 2004090921 | A | * | 3/2004 | B62J 9/00 |

* cited by examiner

FIG.4
[AMENDED]
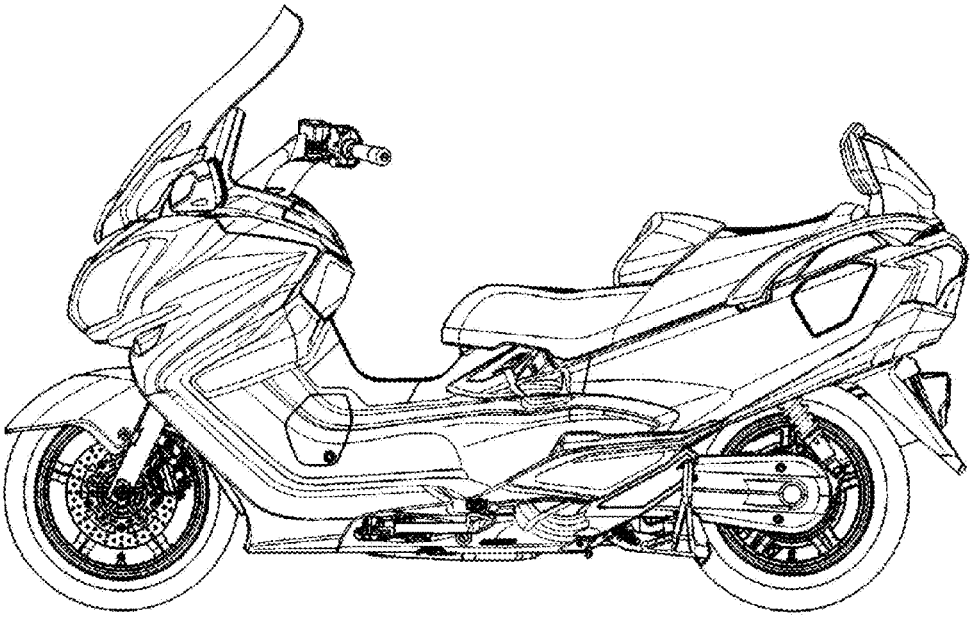

FIG.5
[AMENDED]
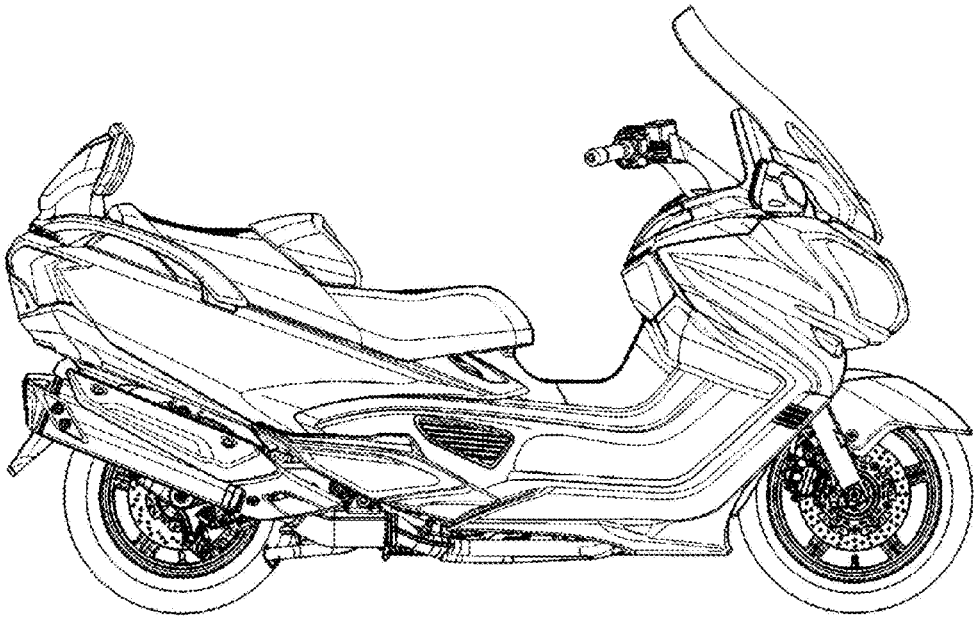

FIG.6
[AMENDED]
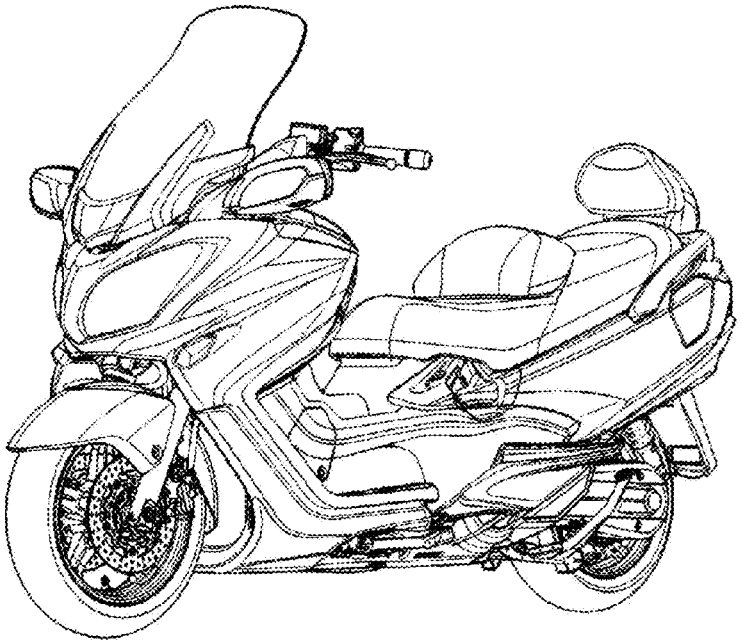

FIG.7
[AMENDED]
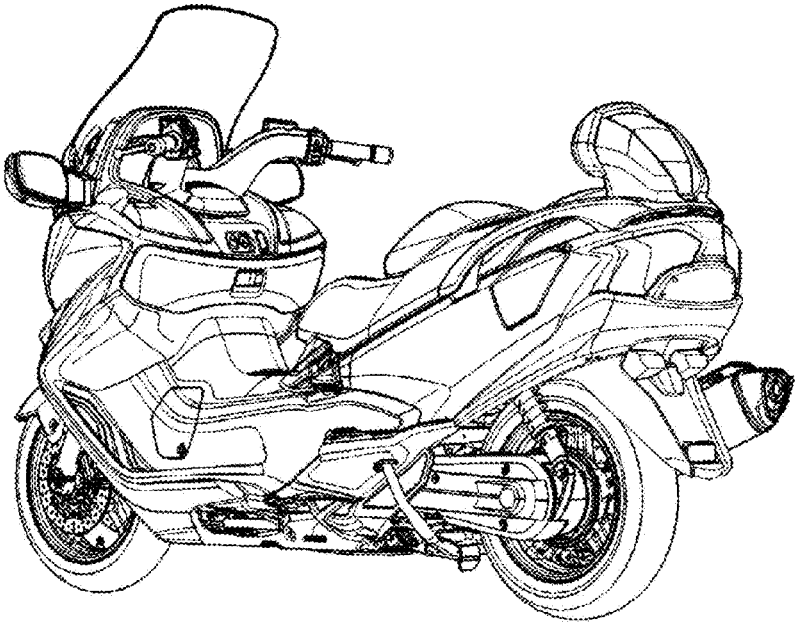

FIG.8
[AMENDED]
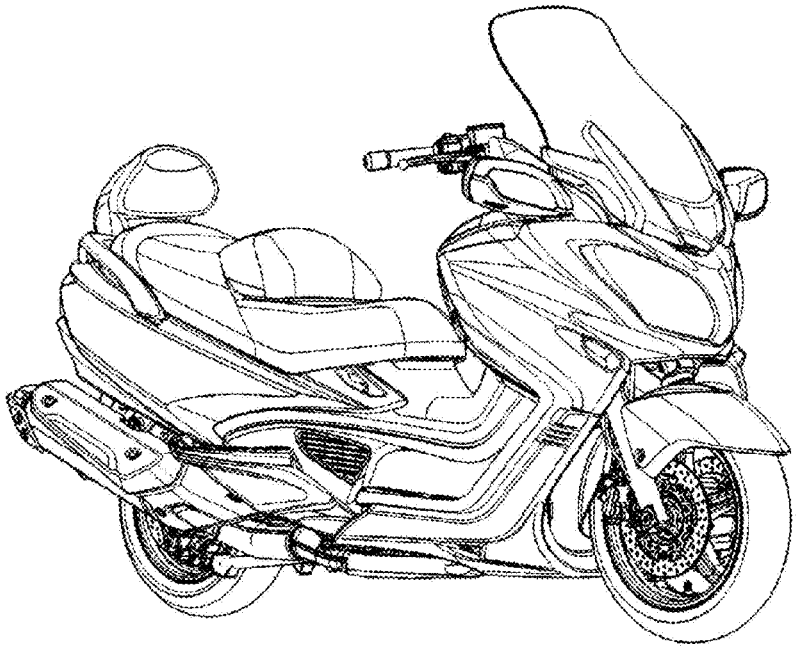

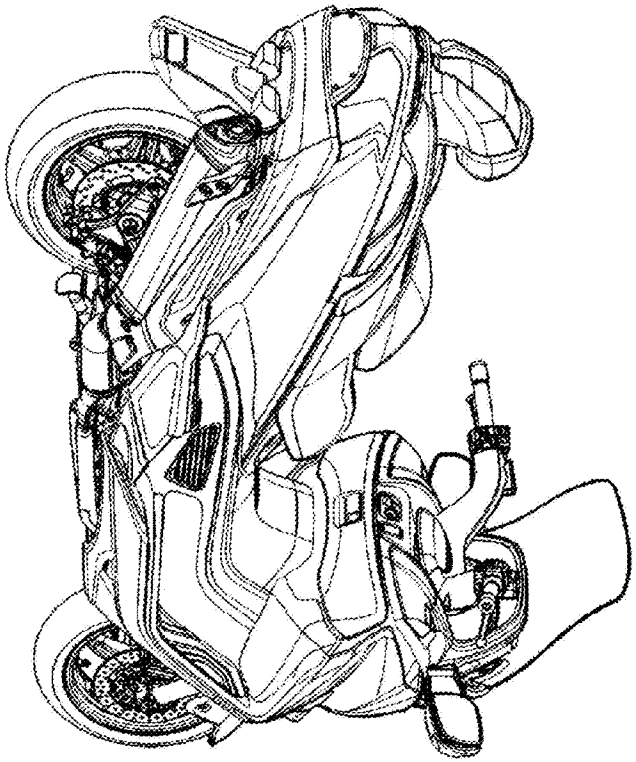

FIG.9
[AMENDED]